United States Patent
Zhu (10) Patent No.: US 9,022,441 B2
(45) Date of Patent: May 5, 2015

(54) CLAMPING MECHANISM

(71) Applicants: Hong Fu Jin Precision Industry (ShenZhen) Co., Ltd., Shenzhen (CN); Hon Hai Precision Industry Co., Ltd., New Taipei (TW)

(72) Inventor: Yong-Gang Zhu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/312,927

(22) Filed: Jun. 24, 2014

(65) Prior Publication Data
US 2015/0001867 A1  Jan. 1, 2015

(30) Foreign Application Priority Data
Jun. 26, 2013  (CN) .......................... 2013 1 0258698

(51) Int. Cl.
| B25J 13/00 | (2006.01) |
|---|---|
| B65G 47/26 | (2006.01) |
| B25J 15/00 | (2006.01) |
| B25J 15/06 | (2006.01) |

(52) U.S. Cl.
CPC .......... B25J 15/0052 (2013.01); B25J 15/0616 (2013.01)

(58) Field of Classification Search
USPC ............ 294/87.1, 81.1, 81.6, 65, 86.4, 119.1, 294/907, 901, 81.2; 414/416.01, 416.02, 414/749.5, 752.1; 198/468.3
See application file for complete search history.

(56) References Cited

U.S. PATENT DOCUMENTS

| 3,860,280 | A  * | 1/1975  | Karlsson  | 294/87.1 |
|---|---|---|---|---|
| 5,290,134 | A  * | 3/1994  | Baba      | 414/416.01 |
| 6,068,317 | A  * | 5/2000  | Park      | 294/87.1 |
| 6,439,631 | B1 * | 8/2002  | Kress     | 294/87.1 |
| 7,850,217 | B2 * | 12/2010 | Lo        | 414/752.1 |
| 7,954,869 | B2 * | 6/2011  | Shim et al. | 198/468.3 |
| 8,038,191 | B2 * | 10/2011 | Shim et al. | 294/87.1 |
| 8,353,547 | B2 * | 1/2013  | Maffeis   | 294/87.1 |
| 2002/0153735 | A1 * | 10/2002 | Kress  | 294/87.1 |
| 2007/0018468 | A1 * | 1/2007  | Behringer | 294/87.1 |
| 2013/0008138 | A1 * | 1/2013  | Subotincic | 294/81.1 |

* cited by examiner

*Primary Examiner* — Paul T Chin
(74) *Attorney, Agent, or Firm* — Novak Druce Connolly Bove + Quigg LLP (57) ABSTRACT

A clamping mechanism includes an adjusting assembly, a driving assembly and a plurality of clamping assemblies. Each clamping assembly includes a base body slidably sleeved on the driving assembly. The adjusting assembly includes a first adjusting member, and a second adjusting member parallel to the first adjusting member. The first adjusting member is fixed to a base body located on a first end of the plurality of clamping assemblies. Opposite ends of the second adjusting member are fixed to the driving assembly and a base body located on a second end of the plurality of clamping assemblies. Each of the first and second adjusting members respectively define a plurality of first and second steps. The first steps and the second steps slidable resist sidewalls of the base body. An upward direction of the plurality of first steps is reverse to that of the plurality of the second steps.

17 Claims, 6 Drawing Sheets

CLAMPING MECHANISM

FIELD

The present disclosure generally relates to a clamping mechanism, and particularly to a clamping mechanism for clamping workpieces.

BACKGROUND

In industrial production, a clamping mechanism is employed to clamp workpieces.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising", when utilized, means "including, but not necessarily limited to"; it specifically indicates open-ended inclusion or membership in the so-described combination, group, series and the like.

Figure 1:
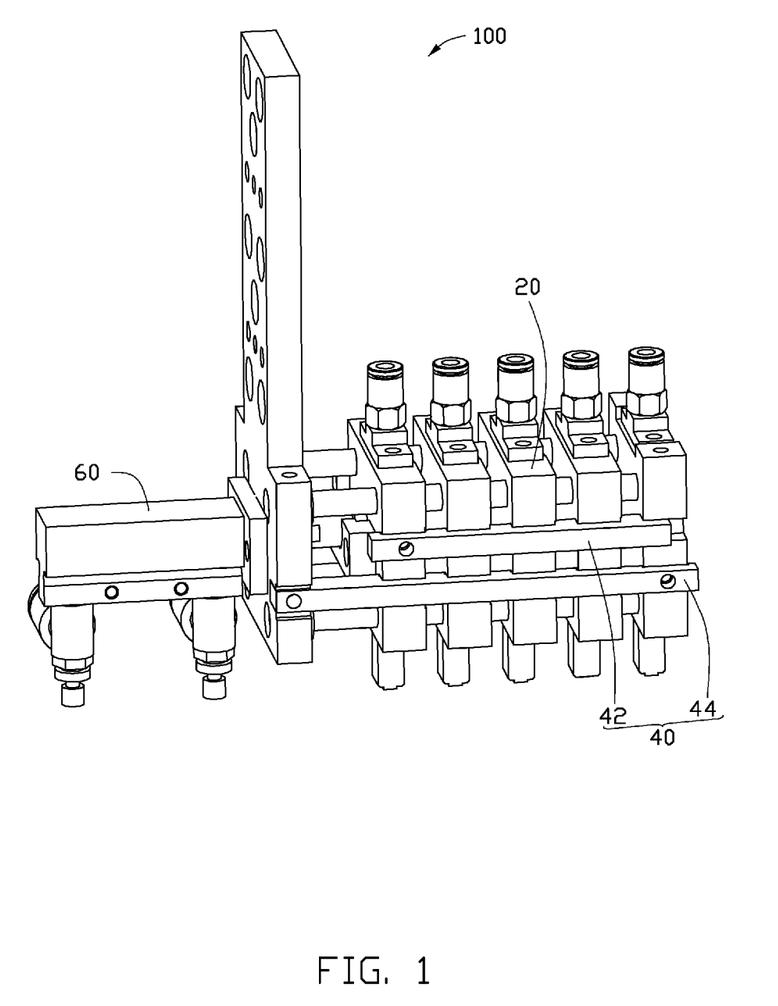
FIG. 1 is an isometric view of a first embodiment of a clamping mechanism including a clamping assembly and a driving assembly.

FIG. 1 illustrates a first embodiment of a clamping mechanism 100 including a plurality of clamping assemblies 20, an adjusting assembly 40, and a driving assembly 60. The plurality of clamping assemblies 20 can be arranged in a series and can be spaced from each other. The adjusting assembly 40 can latch with the plurality of clamping assemblies 20, and can be driven by the driving assembly 60. The driving assembly 60 can be inserted into the clamping assemblies 20, and can be coupled to one clamping assembly 20. The clamping mechanism 100 can be configured for clamping workpieces (not shown) received in a first tray (not shown), which defines a plurality of first receiving grooves therein for receiving the workpieces. The plurality of receiving grooves can be spaced a first distance from each other. The clamping mechanism 100 can be coupled to a moving mechanism (not shown), and the moving mechanism can move the clamping mechanism 100 to a second tray (not shown), which defines a plurality of second receiving grooves spaced from each other at a second distance different from the first distance.

Figure 2:
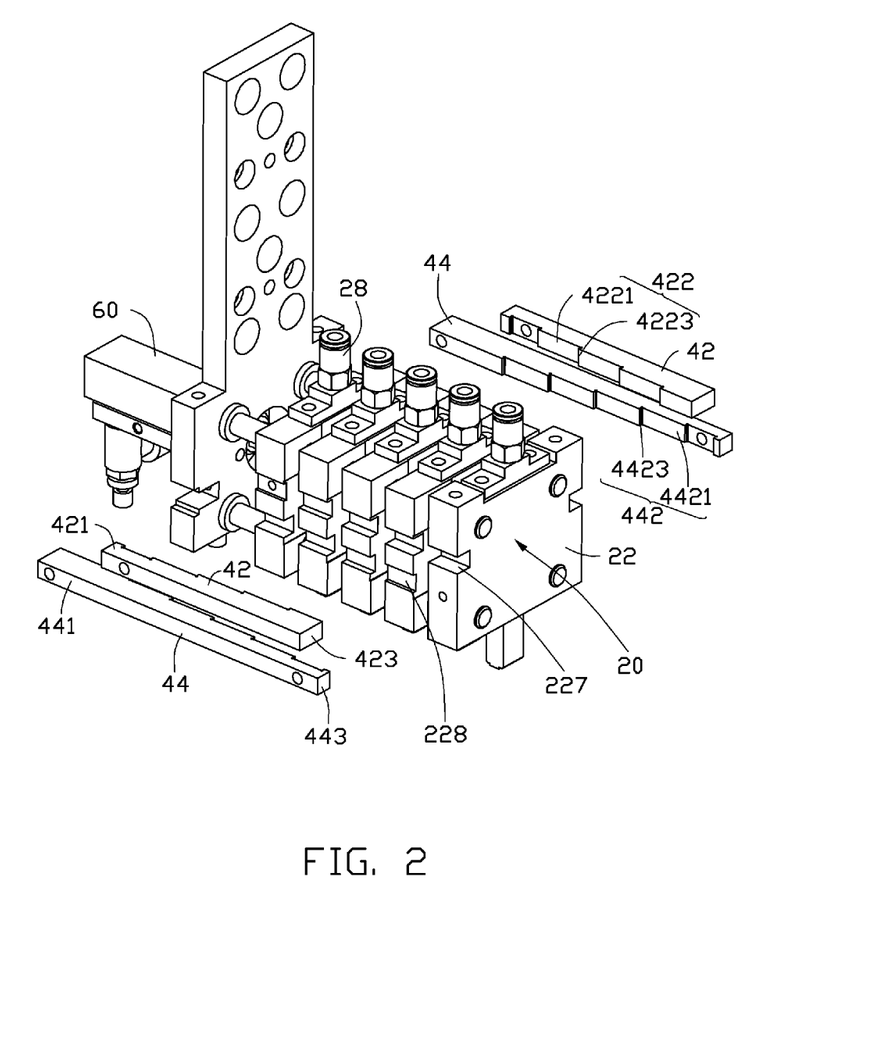
FIG. 2 is an exploded, isometric view of the clamping mechanism of FIG. 1.
Figure 3:
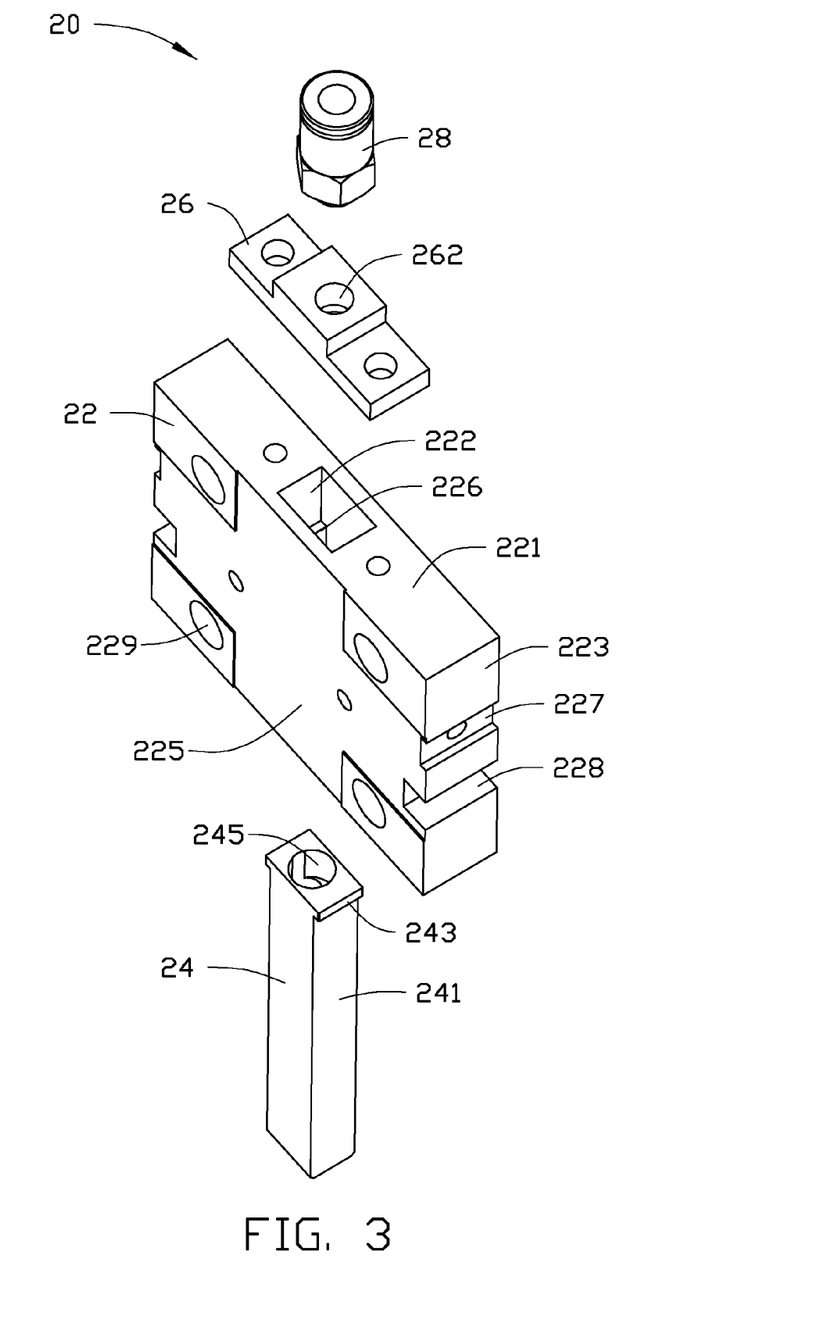
FIG. 3 is an exploded, isometric view of the clamping assembly of FIG. 1.

FIGS. 2 and 3 illustrate that each clamping assembly 20 can include a base body 22, a clamping member 24, a cover 26, and a connecting head 28. The clamping member 24 can be installed on the base body 22. The cover 26 can cover the base body 22 and can be coupled to the connecting head 28. In the illustrated embodiment, the clamping mechanism 100 includes five clamping assemblies 20, each clamping member 24 clamps workpieces via a vacuum pump. In other embodiments, the number of the clamping assemblies 20 can be two, three, four, or more, and each clamping member 24 can clamp workpieces via a mechanical device.

The base body 22 can be substantially rectangular, and can include two opposite first side surfaces 221, two opposite second side surfaces 223 connected to the two first side surfaces 221, and two third side surfaces 225 connecting the two first side surfaces 221 and the corresponding second side surface 223 respectively. The base body 22 can define a channel 222 through the two first side surfaces 221. The channel 222 can be substantially T-shaped, and include a flange 226 protruding from an inner sidewall. The base body 22 can define a first sliding groove 227 and a second sliding groove 228 spaced from the first sliding groove 227 on each second side surface 223. In the illustrated embodiment, a depth of the five first sliding grooves 227, formed on the five base bodies 22, gradually increases along a direction away from the driving assembly 60. The base body 22 away from the driving assembly 60 does not define the second sliding groove 228, and a depth of the four second sliding grooves 228, formed on the four base bodies 22, gradually decreases along the direction away from the driving assembly 60. The base body 22 can define a plurality of sliding holes 229 cutting through the two third side surfaces 225. The plurality of sliding holes 229 can be located on opposite sides of the channel 222. In the illustrated embodiment, the number of the plurality of sliding holes 229 is four. In other embodiments, the number of the sliding holes 229 can be one, two, three, or more.

The clamping member 24 can be received in the channel 222, and can extend out of one first side surface 221. The clamping member 24 can be substantially T-shaped and cylindrical, and the shape of the clamping member 24 can match with that of the channel 222. The clamping member 24 can include a main body 241, and a locking portion 243 formed on an end of the main body 241. Two sides of the locking portion 243 can extend out of a periphery of the main body 241. The main body 241 can be received in the channel 222 and latch with the flange 226. The clamping member 24 can define a vent 245 communicating with the channel 222 and cutting through the main body 241 and the locking portion 243. The vent 245 can extend along a longitudinal direction of the clamping member 24.

The cover 26 can be arranged on, and coupled to, the first side surface 221 of the base body 22. A through hole 262 can be defined in the cover 26 communicating with the channel 222. The connecting head 28 can be inserted into the through hole 262 and communicate with the channel 222.

FIG. 2 illustrates the adjusting assembly 40 including two first adjusting members 42 substantially parallel to each other, and two second adjusting members 44 substantially parallel to each other. The second adjusting member 44 can be substantially parallel to the first adjusting member 42. The first adjusting member 42 can latch with the plurality of first sliding grooves 227 and be coupled to a base body 22 adjacent to the driving assembly 60. The first adjusting member 42 can be strip-shaped and include a fixing end 421, a latching end 423 opposite to the fixing end 421, and a plurality of first steps 422 arranged between the fixing end 421 and the latching end 423 in order. A length of the plurality of first steps 422 can be the same. A height of the plurality of first steps 422 can gradually increase along a direction from the fixing end 421 to the latching end 423. The first step 422 can include a resisting portion 4221 and a latching portion 4223 perpendicularly extending from a side of the resisting portion 4221. Each resisting portion 4221 can connect two latching portions 4223 of two adjacent first steps 422. The resisting portions 4221 of the first steps 422 can resist a bottom of the first sliding grooves 227 and slide along the first sliding grooves 227. Each latching portion 4223 of the first steps 422 can resist the third side surface 225 of the corresponding base body 22. A first step 422 adjacent to the fixing end 421 can be coupled to the corresponding base body 22. In the illustrated embodiment, each first adjusting member 42 includes five first steps 422, and the first step 422 adjacent to the fixing end 421 only includes a resisting portion 4221. In other embodiments, the number of the first steps 422 can be two, three, four, or more. The number of the first adjusting member 42 and the second adjusting member 44 can both be one, and the first adjusting member 42 and the second adjusting member 44 can be arranged on a side of the base bodies 22 or can be arranged on two opposite sides of the base bodies 22. The first sliding grooves 227 and the second sliding grooves 228 formed on each base body 22 can be one, and the first sliding groove 227 and the second groove 228 can be arranged on one second side surface 223 or be arranged on two opposite second side surfaces 223.

The second adjusting member 44 can be parallel to the first adjusting member 42 and latch with the base bodies 22. The second adjusting member 44 can be coupled to a base body 22 away from the driving assembly 60. The second adjusting member 44 can be strip-shaped and include a fixing end 441, a latching end 443 opposite to the fixing end 441, and a plurality of second steps 442 arranged between the fixing end 441 and the latching end 443 in order. The lengths of the plurality of second steps 442 can be the same. The heights of the plurality of second steps 442 can gradually decrease along the direction from the fixing end 441 to the latching end 443. An upward direction of the plurality of second steps 442 is reverse to that of the plurality of the first steps 422. The length of each second step 442 is the same as that of each first step 422. The second step 442 can include a resisting portion 4421, and a latching portion 4423 perpendicularly extending from a side of the resisting portion 4421. Each resisting portion 4421 can connect two latching portions 4423 of two adjacent second steps 442. The resisting portion 4421 of the second step 442 can resist a bottom of the second sliding groove 228 and slide along the second sliding groove 228. Each latching portion 4423 of the second step 442 and the corresponding latching portion 4223 of the first step 422 respectively resist two opposite third side surfaces 225 of the corresponding base body 22. Thus, each base body 22 is clamped between the first clamping member 42 and the second clamping member 44 through the first step 422 and the second step 442 respectively. A second step 442 adjacent to the latching end 443 can be coupled to the corresponding base body 22. In the illustrated embodiment, the second adjusting member 44 includes five second steps 442. In other embodiments, the number of the second steps 442 can be two, three, four, or more.

Figure 4:
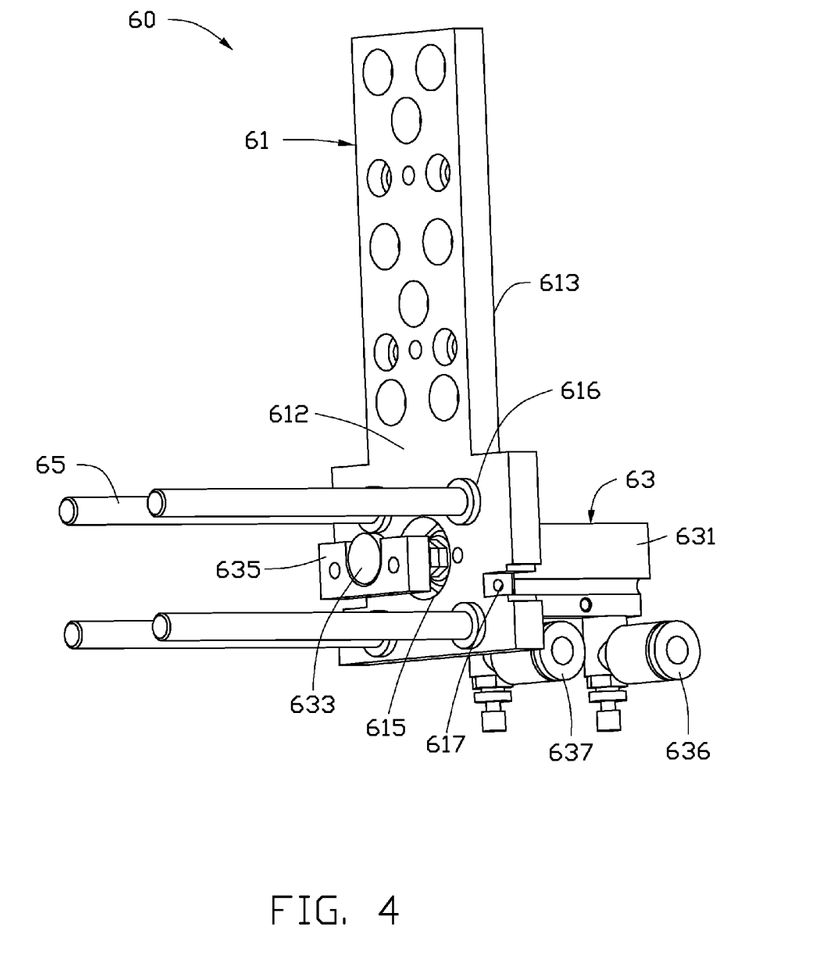
FIG. 4 is an isometric view of the driving assembly of FIG. 1.

FIG. 4 illustrates the driving assembly 60 including a fixing member 61, a driving member 63 coupled to the fixing member 61, and a plurality of supporting members 65 coupled to the fixing member 61. The fixing member 61 can include a first fixing plate 612 and a second fixing plate 618 adjacent to the first fixing plate 612. The first fixing plate 612 can be T-shaped and include a first surface 611 and a second surface 613 (see FIG. 5) opposite to the first surface 611. The first fixing plate 612 can define an inserting hole 615 and a plurality of fixing holes 616 through the first surface 611 and the second surface 613, and the plurality of fixing holes 616 can be arranged spaced from each other surrounding the inserting hole 615. The first fixing plate 612 can also define two fixing grooves 617 on two opposite sides, and each fixing groove 617 cuts through the first surface 611 and the second surface 613. The fixing end 441 of the second adjusting member 44 can be received in the fixing groove 617 and fixed to the fixing member 61 through locking member. The second fixing plate 618 can be adjacent to the second surface 613 and coupled to the first fixing plate 612. The second fixing plate 618 can also cover the inserting hole 615 and define a hole (not shown) communicating with the inserting hole 615.

The driving member 63 can extend through the second fixing plate 618 and be inserted into the inserting hole 615 to be coupled to the base body 22 fixed to the first adjusting member 42. The driving member 63 can include a gas pump 631, a driving rod 633, a connecting member 635, a first gas head 636, and a second gas head 637. An end of the gas pump 631 can be coupled to the second fixing plate 618. One end of the driving rod 633 can be moveably received in the gas pump 631, and another end of the driving rod 633 can extend through the second fixing plate 618 and be inserted into the inserting hole 615 to be coupled to the connecting member 635. The connecting member 635 can be coupled to the base body 22 fixed to the first adjusting member 42. The first gas head 635 can communicate with the gas pump 631, and be configured for coupling a gas unit (not shown), thus the driving rod 633 can be driven to extend outside the gas pump 631. The second gas head 637 can communicate with the gas pump 631, and be configured for coupling a suction device (not shown), thus the driving rod 633 can be driven to retract into the gas pump 631.

The supporting member 65 can be rod-shaped. An end of the supporting member 65 can be inserted into the corresponding fixing hole 616 to couple the first fixing plate 612, and another end of the supporting member 65 can be movably inserted into the corresponding sliding hole 229. In the illustrated embodiment, a number of the supporting members 65 are four. In other embodiments, the number of the supporting member 65 can be one, two, three, or more.

In assembly, the plurality of supporting members 65 can be inserted into the corresponding sliding hole 229 of the base bodies 22. The connecting member 635 can be coupled to a base body 22 and located on an end of the base bodies 22. The first adjusting member 42 can latch with the first sliding grooves 277, and a first step 422 adjacent to the fixing end 421 can be fixed to the corresponding base body 22. The second adjusting member 44 can latch with the base bodies 22, and the fixing end 441 of the second adjusting member 44 can be received in the fixing groove 617 and fixed to the first fixing plate 612. The latching end 443 of the second adjusting member 44 can be fixed to a base body away from the connecting member 635.

Figure 5:
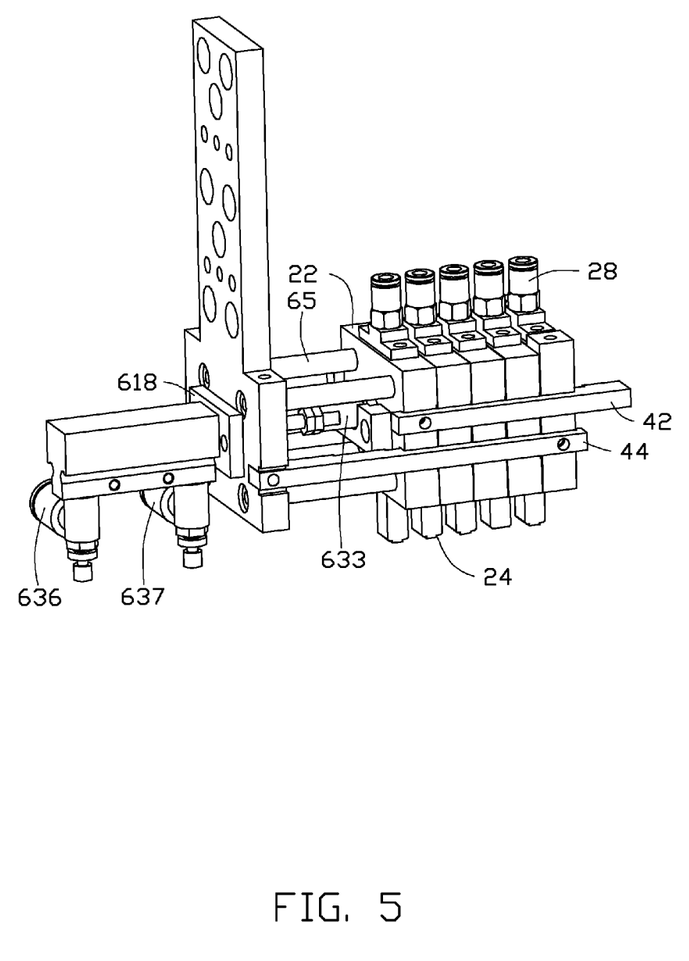
FIG. 5 is the clamping mechanism of FIG. 1 in a using state.

FIG. 5 illustrates that the first gas head 636 can communicate with the gas unit (not shown). The clamping mechanism 100 can clamp a workpiece from a tray. The driving rod 633 can slide the base bodies 22 away from the first fixing plate 612 along the second steps 442 via a pressure of the gas. When the two base bodies 22 away from the connecting member 635 resist against each other, the driving rod 633 is stopped from moving. The plurality of base bodies 22 can be stacked, and a distance between two adjacent clamping members 24 can be the same as a distance between two adjacent first receiving grooves of the tray. The plurality of connecting head 28 can be coupled to a vacuum generator, and the clamping members 24 can suction and clamp the workpiece to the tray.

The workpiece can be moved to other trays which define a plurality of second receiving grooves, and a distance between two adjacent second receiving grooves is different than the distance between two adjacent first receiving grooves. The second connecting head 637 can communicate with the suction device (not shown), and the driving rod 633 can move the first adjusting member 42 towards the first fixing plate 612. Thus, the latching portions 4223 of the first steps 422 can latch with the third side surfaces 225 of the corresponding base body 22. The plurality of base bodies 22 can slide along the plurality of second steps 442 in order from the first fixing plate 612. When a third side surface 225 adjacent to the connecting member 635 resists against the corresponding latching portion 4423 of the second step 442, and two side surfaces 225 of each base body 22 respectively resist against the latching portion 4223 of the first step 422 and the latching portion 4423 of the second step 442. The driving rod 633 is stopped from moving. In this way, the base bodies 22 are spaced from each other, and a distance between two adjacent clamping members 24 is the same as a distance between the two adjacent second receiving grooves.

The cover 26 can be omitted, as long as the connecting head 28 is inserted into the channel 222 and a diameter of the connecting head 28 matches with that of the channel 22. The second fixing plate 618 can be omitted, as long as the pump 631 connects to the first fixing plate 612 and a diameter of the inserting hole 615 matches with the driving rod 633. The connecting member 635 can be omitted as long as the driving rod 633 connects to a base body 22. The first sliding groove 227 and the second sliding groove 228 can both be omitted as long as the resisting portion 4221 of the first step 422 and the resisting portion 4421 of the second step 442 resist against the corresponding second side surfaces 223 of the base body 22.

Figure 6:
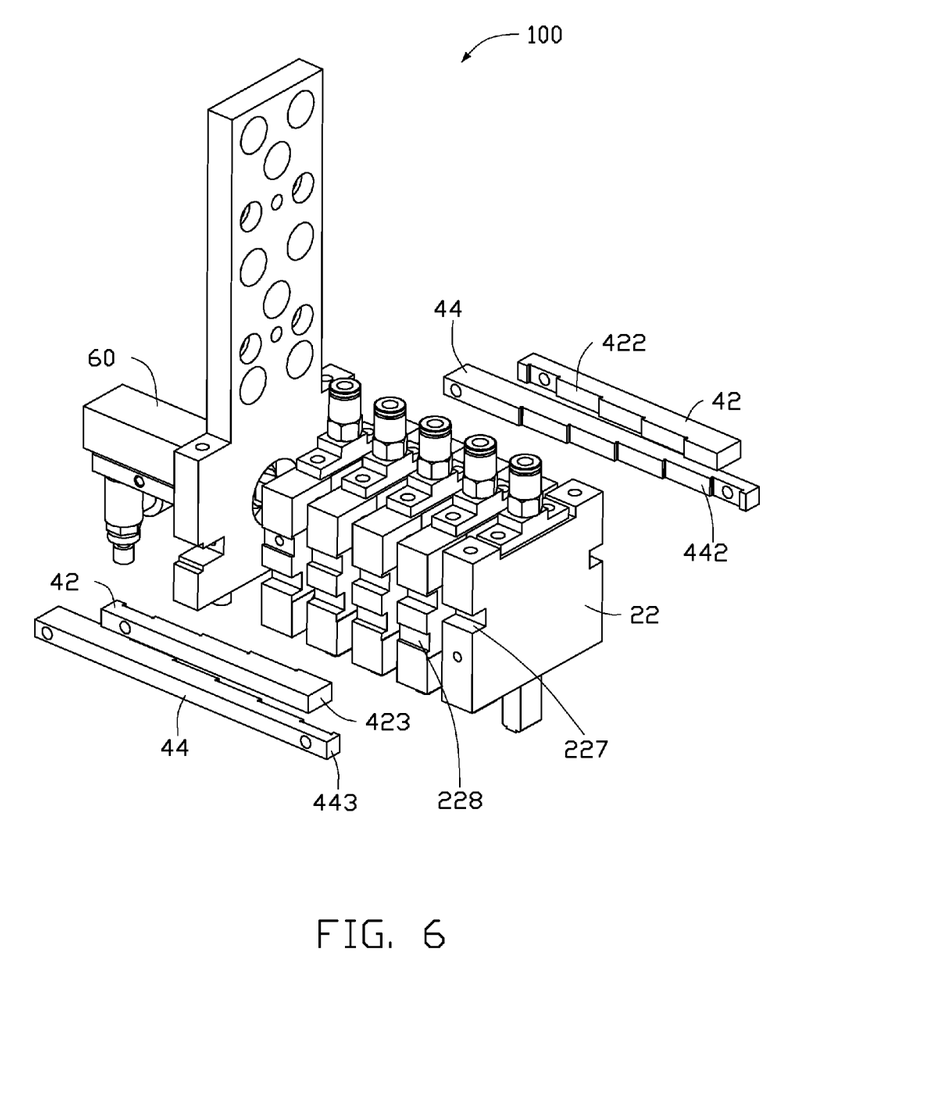
FIG. 6 is an exploded, isometric view of a second embodiment of a clamping mechanism.

FIG. 6 illustrates another clamping mechanism 100 of a second embodiment similar to the clamping mechanism 100 of the first embodiment. A difference being that the driving assembly 60 cannot include the supporting member 65. The first adjusting members 41 can latch with opposite sides of the plurality of base body 22, respectively. The first adjusting member 42 can be completely received in the plurality of first sliding grooves 227, and a side of the first adjusting member 42 away from the first steps 422 can be level with the second side surface 223 of the base body 22. The second adjusting member 44 can be completely received in the plurality of second sliding grooves 228, and a side of the second adjusting member 44 away from the second steps 442 can be level with the second side surface 223 of the base body 22.

The number of the first adjusting members 42 and the second adjusting members 44 can be both one, and the adjusting member 42 and the second adjusting member 44 can be located on opposite sides of the plurality of base bodies 22 to support the base bodies 22.

While the present disclosure has been described with reference to particular embodiments, the description is illustrative of the disclosure and is not to be construed as limiting the disclosure. Therefore, those of ordinary skill in the art can make various modifications to the embodiments without departing from the true spirit and scope of the disclosure, as defined by the appended claims.

What is claimed is:

1. A clamping mechanism comprising:
a plurality of clamping assemblies each comprising a base body and a clamping member assembled to the base body;
a driving assembly comprising a fixing member;
a driving member coupled to the fixing member and fixedly coupled to the base body adjacent to the fixing member;
a supporting member having a first end and a second end, wherein the first end is fixedly coupled to the fixing member and the second end extends into the base body of each of the plurality of clamping assemblies;
an adjusting assembly comprising:
a first adjusting member having an end being fixedly coupled to the base body adjacent to the fixing member and defining a plurality of first steps slidably resisting sidewalls of the each of the base bodies, wherein a height of the plurality of first steps increases in a direction away from the fixing member;
a second adjusting member parallel to the first adjusting member having opposite ends that are respectively fixedly coupled to the fixing member and the base body away from the fixing member, and the second adjusting member further defining a plurality of second steps slidably resisting sidewalls of the each of the base bodies, wherein a height of the plurality of second steps increases in a direction away from the fixing member;
wherein the driving member is configured to drive the base body to move and thereby driving the first adjusting member to move, so that each first step latches with a side surface of the corresponding base body away from the fixing member, and each second step latches with a side surface of the corresponding base body adjacent to the fixing member causing the adjusting assembly to hold the plurality of clamping assemblies.

2. The clamping mechanism of claim 1, wherein the first adjusting member comprises a fixing end fixed to the base body adjacent to the fixing member, and a latching end opposite to the fixing end, the plurality of first steps are arranged between the fixing end and the latching end, and the heights of the plurality of first steps gradually increase from the fixing end to the latching end.

3. The clamping mechanism of claim 1, wherein the second adjusting member comprises a fixing end fixed to the fixing member, and a latching end opposite to the fixing end and fixed to the base body away from the fixing member, the plurality of second steps are arranged between the fixing end and the latching end, and the heights of the plurality of second steps gradually decrease from the fixing end to the latching end.

4. The clamping mechanism of claim 1, wherein each first and second step comprises a resisting portion slidably resisting a side surface of the corresponding base body, and a latching portion perpendicularly extending from an end of the resisting portion and latching with a side surface of the corresponding base body, the latching portion connects two adjacent resisting portion.

5. The clamping mechanism of claim 4, wherein a length of the resisting portion of the first step is the same as a length of the second step.

6. The clamping mechanism of claim 1, wherein each base body defines a first sliding groove and a second sliding groove on a side surface adjacent to the first adjusting member and the second adjusting member, the first and second sliding groove cut through two opposite side surface of the base body, the first sliding groove is spaced from the second sliding groove, and each first step slidably resist the bottom of the first sliding groove, each second step slidably resist the bottom of the second sliding groove.

7. The clamping mechanism of claim 6, wherein depths of the plurality of first sliding grooves gradually increase along a direction away from the fixing member, and depths of the plurality of second sliding grooves gradually decrease along the direction away from the fixing member.

8. The clamping mechanism of claim 1, each base body defines a channel, the channel protrudes a flange from an inner sidewall, each clamping member comprises a main body and a locking portion formed on an end of the main body, the main body is received in the channel and extend out of the channel, the latching portion latches with the flange, the clamping member defines a vent cutting through the main body and the locking portion communicating with the channel.

9. The clamping mechanism of claim 1, wherein each clamping assembly further comprises a cover fixed on the corresponding base body and a connecting head, the cover defines a through hole communicating with the channel, the connecting head is received in the through hole.

10. The clamping mechanism of claim 1, wherein the fixing member comprises a first fixing plate, the second adjusting member is fixed to the first fixing plate, the first fixing plate define an inserting hole, the driving member comprising a gas pump fixed to the first plate, and a driving rod slidable received in the gas pump, the driving rod inserts into the inserting hole and is fixed to the base body adjacent to the first fixing plate.

11. The clamping mechanism of claim 10, wherein the driving member further comprises a connecting member fixed to the base body adjacent to the first fixing plate, an end of the driving rod away from the gas pump is fixed to the connecting member.

12. A clamping mechanism comprising:
a plurality of clamping assemblies each comprising a base body and a clamping member assembled to the base body, wherein each base body defining a first sliding groove and a second sliding groove in opposite sides thereof;
a driving assembly comprising a fixing member;
a driving member coupled to the fixing member and fixedly coupled to the base body adjacent to the fixing member;
an adjusting assembly comprising:
a first adjusting member having an end being fixedly coupled to the base body adjacent to the fixing member and defining a plurality of first steps slidably resisting sidewalls of the each of the base bodies, wherein a height of the plurality of first steps increases in a direction away from the driving assembly and the first adjusting member is completely received in the first sliding grooves;
a second adjusting member parallel to the first adjusting member having opposite ends that are respectively fixedly coupled to the fixing member and the base body away from the fixing member, and the second adjusting member further defining a plurality of second steps slidably resisting sidewalls of the each of the base bodies, wherein a height of the plurality of second steps increases in a direction away from the fixing member and the second adjusting member is completely received in the second sliding grooves;
wherein the driving member is configured to drive the base body to move and thereby driving the first adjusting member to move, so that each first step latches with a side surface of the corresponding base body away from the fixing member, and each second step latches with a side surface of the corresponding base body adjacent to the fixing member causing the adjusting assembly to hold the plurality of clamping assemblies.

13. The clamping mechanism of claim 12, wherein each first and second step comprises a resisting portion slidably resisting a side surface of the corresponding base body, and a latching portion perpendicularly extending from an end of the resisting portion and latching with a side surface of the corresponding base body, the latching portion connects two adjacent resisting portion.

14. The clamping mechanism of claim 13, wherein a length of the resisting portion of the first step is the same as a length of the second step.

15. The clamping mechanism of claim 12, each base body defines a channel, the channel protrudes a flange from an inner sidewall, each clamping member comprises a main body and a locking portion formed on an end of the main body, the main body is received in the channel and extend out of the channel, the latching portion latches with the flange, the clamping member defines a vent cutting through the main body and the locking portion communicating with the channel.

16. The clamping mechanism of claim 12, wherein each clamping assembly further comprises a cover fixed on the corresponding base body and a connecting head, the cover defines a through hole communicating with the channel, the connecting head is received in the through hole.

17. The clamping mechanism of claim 12, wherein the fixing member comprises a first fixing plate, the second adjusting member is fixed to the first fixing plate, the first fixing plate define an inserting hole, the driving member comprising a gas pump fixed to the first plate, and a driving rod slidable received in the gas pump, the driving rod inserts into the inserting hole and is fixed to the base body adjacent to the first fixing plate.

* * * * *